Sept. 24, 1968         A. R. KAHN ET AL         3,402,604
                          FLOWMETER
                     Filed June 28, 1965
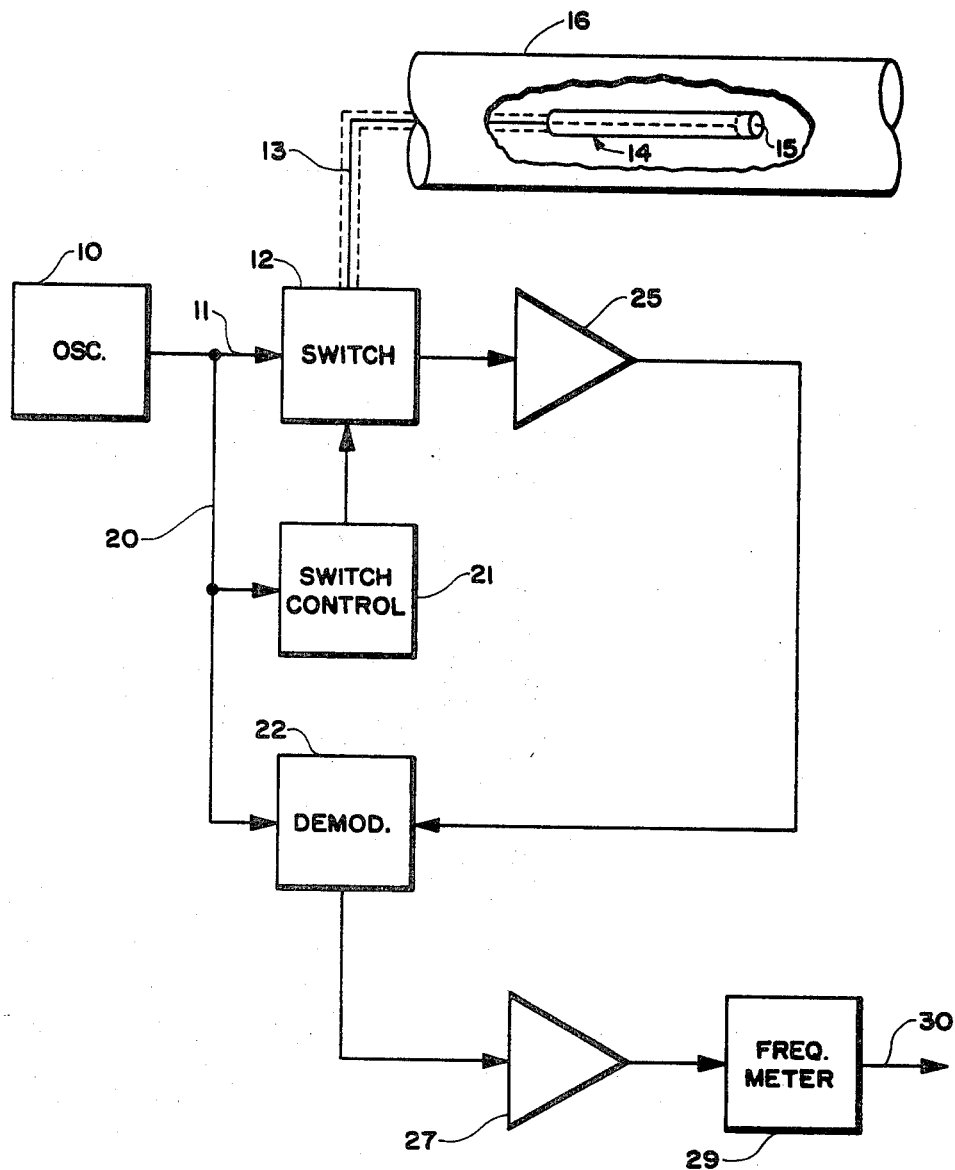
INVENTOR.
ALAN R. KAHN
BY    MAX D. LISTON

United States Patent Office 3,402,604
Patented Sept. 24, 1968

3,402,604
FLOWMETER
Alan R. Kahn, Fullerton, and Max D. Liston, La Habra, Calif., assignors to Beckman Instruments, Inc., a corporation of California
Filed June 28, 1965, Ser. No. 467,554
5 Claims. (Cl. 73—194)

ABSTRACT OF THE DISCLOSURE

A pulsed ultrasonic flowmeter for measuring flow of fluids using a single crystal transducer to which a train of pulses is applied for a predetermined period of time after which the transistor is switched to an amplifier through a switch control synchronized by the oscillator. The signal received through the amplifier is then compared with the original signal and the difference applied to a discriminator which provides an output signal that is a linear function of fluid velocity.

---

This invention relates to ultrasonic flowmeters and more particularly to a single transducer ultrasonic flowmeter for measuring fluid flow, such as blood flow in animals.

Numerous approaches have been devised for measuring fluid flow. One example of an electro-acoustic flowmeter may be found in U.S. Patent No. 2,912,856 which utilizes a pair of piezoelectric transducers mounted on opposite sides of a pipe through which fluid flows. Each transducer includes, in effect, a transmitting piezoelectric crystal and a receiving piezoelectric crystal. The transmitting crystal of one transducer and the receiving crystal of the other transducer are interconnected by a feedback circuit including an amplifier and a wave packet generator. Each received wave packet is amplified and triggers the generator so as to cause wave packets to be repropagated in a sustained manner. The acoustic waves are thus propagated through the fluid in opposite directions along substantially the same path. Any change in the flow velocity of the fluid will be accompanied by a corresponding change in the repetition frequency of the wave packets and the magnitudes of the respective changes will be in constant direct ratio to the flow velocity being measured.

Various problems are encountered in measuring the flow of biological fluids, such as blood, in animals. Probably the most successful techniques have been the use of acoustical, ultrasonic and electromagnetic flowmeters. Other techniques including the use of rotameters, bubble flowmeters and Pitot tubes also have been tried. Because these latter devices come in contact with the fluid, their calibration is easily affected by clotting when used as blood flowmeters. The electromagnetic or ultrasonic flowmeter has been considered as a more suitable device for blood flow since it is used external to the vessel. Many of the flows which are of importance in physiological investigations are in small vessels and in vessels with flow velocities. Various experiments with ultrasonic flowmeters are described in an article entitled "Pulsed Ultrasonic Transit Time Flowmeter" by D. L. Franklin et al. which appeared in I.R.E. Transactions on Bio-Medical Electronics, vol. 9, No. 1, January 1962, and an article entitled "A Phase-Shift Ultrasonic Flowmeter" by W. C. Zarnstorff et al. which appeared in vol. 9, No. 3 of the same Transactions in July 1962.

The operation of an ultrasonic flowmeter is based upon the principle that ultrasonic waves traveling in a moving medium travel slightly faster downstream and slower upstream. The difference in effective velocity of the waves or pulses alternately upstream and downstream is a measure of the velocity of the fluid. As noted in the first publication "Pulsed Ultrasonic Transit Time Flowmeter" cited above, barium titanate crystals are mounted at diagonally opposite positions in a rigid plastic cylinder, and bursts of ultrasound travel from one crystal to the other in either direction in the same time so long as the medium between them is stationary. When the medium is flowing through the cylinder, the transit time of sound between the two crystals is slightly greater upstream than downstream.

There are two principal methods of measuring transit time of the wave in the fluid. First, a short burst or pulse of energy may be sent through the fluid to a receiving point and the transit time determined by measuring the elapsed time between the transmitted pulse and the received pulse. By repeating this alternately upstream and downstream the difference in transit time can be determined. A second approach is to send a continuous sinusoidal wave from the transmitting element to the receiving element and measuring the transit time by the phase shift between the received signal and the transmitted signal. The phase shift is proportional to the total time delay in the direction of transmission. The difference in transit time can then be obtained by comparing the upstream phase shift to the downstream phase shift. This latter approach is discussed in greater detail in the second article "A Phase Shift Ultrasonic Flowmeter" discussed above.

Although the ultrasonic flowmeter techniques discussed above have proved successful, it is frequently desirable to provide an accurate flowmeter of such size that it may be suitably used in a catheter. Accordingly, it is an object of the present invention to provide an ultrasonic flowmeter for biological liquids which is suitable for catheter use.

It is an additional object of the present invention to provide an ultransonic flowmeter for use in biological liquids in which a single transducer is used as a generator and receiver.

It is a further object of the present invention to provide a pulsed ultrasonic flowmeter utilizing a single transducer, which is small enough to be inserted into a catheter.

In accordance with a specific exemplary embodiment of the present invention a pulsed ultrasonic flowmeter for measuring the flow in biological liquids is provided. A single ultrasonic transducer is employed as well as Doppler shift measurement techniques. A train of pulses from a suitable oscillator is applied to the ultrasonic transducer for a predetermined period of time. After a further period of time, determined by the distance in front of the transducer that the flow measurement is desired, the output of the transducer is applied to an amplifier for a predetermined period of time. The received signal is compared with the original signal and the resultant difference frequency is fed to a discriminator to convert the difference frequency into a signal which is a function of fluid flow.

Other objects and features of the present invention will become more readily apparent through a consideration of the following written description taken in connection with the appended drawing, the single figure of which illustrates an ultrasonic flowmeter constructed in accordance with the teachings of the present invention.

Referring now to the drawing, a radio frequency generator or oscillator 10 is connected through a line 11 to a transmit/receive switch 12. The switch 12 is connected through a suitable cable 13 to a probe 14 having an ultrasound crystal transducer 15 located therein. The crystal may be a barium titanate crystal. The probe 14 is shown situated in a vessel 16, such as a blood vessel of an animal subject.

The output of the oscillator 10 also is connected through a line 20 to a switch control 21 and a synchronous demodulator 22. The switch control 21 is connected to control the operation of the switch 12. The switch 12 is also connected through an RF amplifier 25 to the synchronous demodulator 22. The output of the synchronous demodulator 22 is connected through a differential amplifier 27 to a frequency meter 29 which in turn has an output 30 which may be connected to a recorder or other suitable indicator.

The output of the oscillator 10 is applied through the switch 12 to the transducer crystal 15 for a predetermined time, after which the switch 12 disconnects the output of the oscillator 10 from the crystal 15 and in turn connects the crystal 15 through the switch 12 to the input of the amplifier 25. The switching action of the switch 12 is controlled by the switch control 21 and is thus synchronized with the output of the oscillator 10 inasmuch as the input to the control 21 is supplied by the oscillator. This synchronization is provided to maintain a fixed phase relationship since the switching signal applied to the switch 12 from the control 21 may beat with the output of the oscillator 10 or output of the transducer 15 and seriously limit the sensitivity and accuracy achievable. The received signal after amplification by the amplifier 25 is effectively compared with the original oscillator signal by applying both the output of the oscillator 10 and the output of the amplifier 25 to the synchronous demodulator 22. The resulting difference frequency is applied through the differential amplifier 27 to the frequency meter 29 for converting the output frequency into an analog output signal which is a linear function of fluid flow and which may be recorded. It is to be understood that the interconnections and/or components, particularly those functioning in the high frequency range, should be suitably shielded.

The oscillator 10 typically provides an output in the megacycle range, for example between 2.5 and 5 mc. This output may be divided by the control 21 to provide the desired switching frequency such as, 10 kc. to 30 kc. The control 21 may include a frequency divider, and a controllable switching frequency may be provided by using various outputs of the frequency divider and by using suitable variable delay circuits if desired. One arrangement which has been utilized succesfully for providing an adjustable switching frequency is a divider for dividing the oscillator output by 64, with the output of the divider being applied through adjustable trigger circuits of a commercially available oscilloscope to suitably delay the switching signals.

The output of the oscillator 10 is applied to the transducer 15 for a period of time. Following this, it is preferable to provide a delay before switching the transducer 15 to the input of the amplifier 25. The magnitude of this delay is determined by the time required for the transducer 15 to stop vibrating as a result of the applied signal from the oscillator 10, but more particularly is determined by the distance in front of the transducer that the flow measurement is desired. That is, the delay typically provided is two times the transit time of the ultrasonic output of the transducer between the transducer and the point ahead of the transducer at which a measurement is desired.

Where the velocity of sound is much greater than the flow being measured, the mean distance in front of the transducer of the measurement being taken is given by the formula, $$d = 2\frac{C}{t}$$

where:

$d$ is equal to the distance in front of the probe;
$C$ is equal to the velocity of sound in blood (1.5 cm./sec.$\times 10^5$); and
$t$ is equal to the time in seconds from the beginning of the transmitted pulse to the beginning of the received pulse.

Typical suitable values may be, for example $t$ equal to 20 microseconds and $d$ equal to 1.5 cm.

The returned frequency signal from the fluid, such as blood, will differ from the transmitted frequency by $$f_r = 2f_s \frac{V}{C}$$

where:

$f_r$ is equal to the difference frequency of the received and transmitted frequency;
$f_s$ is equal to the transmitted frequency; and
$V$ is equal to the velocity of blood flow.

For example, with a blood flow of 100 cm./sec. the returned frequency is shifted by $$f_r = 2 \times 5 \times 10^6 \times \frac{100}{1.5 \times 10^5} = 6{,}667 \text{ cycles}$$

for $f_s = 5$ mc.

It is important to note that the flowmeter according to the present invention has a direct linear relationship between flow and frequency and does not require calibration.

In some instances it is desirable to provide a low pass filter at the output of the differential amplifier 27 to filter out the switching frequency signal. The size of the probe 14 depends upon its intended use. Various size transducers may be utilized. In early tests, a barium titanate crystal having a diameter of ¼ inch mounted in the end of a probe arranged approximately 45° to the axis of the flow stream was utilized. For catheter use, the crystal 15 may have a smaller diameter, such as, approximately .072 inch and a thickness of .005 inch. An even smaller crystal having a diameter of .033 inch and a thickness of .006 inch has been constructed in a probe having an over-all external diameter of .055 inch. For a further understanding of probe and transducer structure, reference may be made to copending application Ser. No. 467,555 entitled Flowmeter filed concurrently herewith in the names of Max D. Liston, Cedric H. Beebe and John T. Woolhouse and assigned to the assignee of the present invention.

It now should be apparent that the present invention provides a new and improved ultrasonic flowmeter utilizing a single ultrasonic transducer and Doppler shift measurement techniques. Although an exemplary embodiment of the invention has been disclosed and discussed, it will be understood that other applications of the invention are possible and that the embodiment and methods disclosed may be subjected to various changes, modifications and substitutions without necessarily departing from the spirit of the invention.

What is claimed is:

1. An ultrasonic flowmeter for use with a transducer for measuring fluid flow comprising an oscillator for producing output frequency signals suitable for driving said transducer, the improvement comprising switching means coupled with said oscillator and adapted to be connected to said transducer for applying driving signals from said oscillator to said transducer for a predetermined period of time, said switching means also adapted to receive and apply for a predetermined period of time to an output thereof doppler shifted frequency signals received by said transducer, switch control means synchronized with said oscillator for controlling the operation of said switching means, first circuit means coupled with the output of said oscillator and coupled with said output of said switching means to provide a resultant difference frequency output, and second circuit means coupled with said first circuit means for converting said difference frequency into a signal which is indicative of the velocity of fluid flow.

2. An ultrasonic flowmeter as in claim 1 wherein
said first circuit means includes a demodulator, means coupling the output of said oscillator to said demodulator, and means coupling said output of said switching means to said demodulator whereby said demodulator provides output signals proportional to the difference between the input signals thereto, and
said second circuit means includes a frequency to voltage converter for converting said output signals to voltages proportional thereto.

3. An ultrasonic transducer as in claim 2 wherein
said transducer includes a crystal of barium titanate, and said crystal is driven by said oscillator at an ultrasonic frequency.

4. An ultrasonic flowmeter for use with a transducer for measuring fluid flow comprising an oscillator for producing output frequency signals suitable for driving said transducer, the improvement comprising
switching means coupled with said oscillator and adapted to be connected to said transducer for applying driving signals from said oscillator to said transducer for a predetermined period of time,
said switching means also adapted to receive and apply for a predetermined period of time to an output thereof doppler shifted frequency signals received by said transducer.
switch control means synchronized with said oscillator and coupled to said switching means for causing said switching means to apply the output of said oscillator to said transducer for a predetermined period of time and subsequently causing the switching means to apply the doppler frequency signals received by the transducer to said output of said switching means,
first circuit means coupled with the output of said oscillator and coupled with said output of said switching means to provide a resultant difference frequency output, and
second circuit means coupled with said first circuit means for converting said difference frequency into a signal which is a function of the velocity of fluid flow.

5. An ultrasonic flowmeter for use with a transducer for measuring the velocity of fluid flow comprising an oscillator for producing output frequency signals suitable for driving said transducer, the improvement comprising
switching means including first, second, third and fourth terminal means, said first terminal means being connected with the output of said oscillator, and said second terminal means being adapted to be connected to said transducer for applying driving signals from said oscillator to said transducer for a predetermined period of time repetitively.
said switching means also adapted to receive at said second terminal means and apply to said third terminal means thereof for a predetermined period of time repetitively doppler shifted frequency signals received by said transducer,
switch control means coupled between the output of said oscillator and said fourth terminal means of said switching means, said switch control means being synchronized with said oscillator output for controlling the operation of said switching means,
circuit means coupled with the output of said oscillator and the third terminal means of said switching means to provide output signals proportional to the difference between the input signals thereto, said output signals being indicative of the velocity of fluid flow.

References Cited

UNITED STATES PATENTS

| | | |
|---|---|---|
| 1,864,638 | 6/1932 | Chilowsky. |
| 2,770,795 | 11/1956 | Peterson. |
| 2,841,775 | 7/1958 | Saunders. |
| 2,908,888 | 10/1959 | Kirkland. |
| 3,276,249 | 10/1966 | King. |

OTHER REFERENCES

An article from "Ultrasonics," April–June 1964, by S. Kimoto et al. entitled "Ultrasonic Tomography of the Liver and Detection of Heart Atrial Septal Defect With the Aid of Ultrasonic Intravenous Probes," pages 82–86, page 82. (73–67.9).

JAMES J. GILL, *Primary Examiner.*